R. S. McLEOD.
ALTERNATING CURRENT REGULATOR.
APPLICATION FILED OCT. 22, 1906.

913,757.

Patented Mar. 2, 1909.
5 SHEETS—SHEET 1.

Attest.
C. S. Middleton
E. N. Sarton

Inventor
Robert S. McLeod
By Spear, Middleton, Donaldson & Spear
Attys

R. S. McLEOD.
ALTERNATING CURRENT REGULATOR.
APPLICATION FILED OCT. 22, 1906.

913,757.

Patented Mar. 2, 1909.
5 SHEETS—SHEET 2.

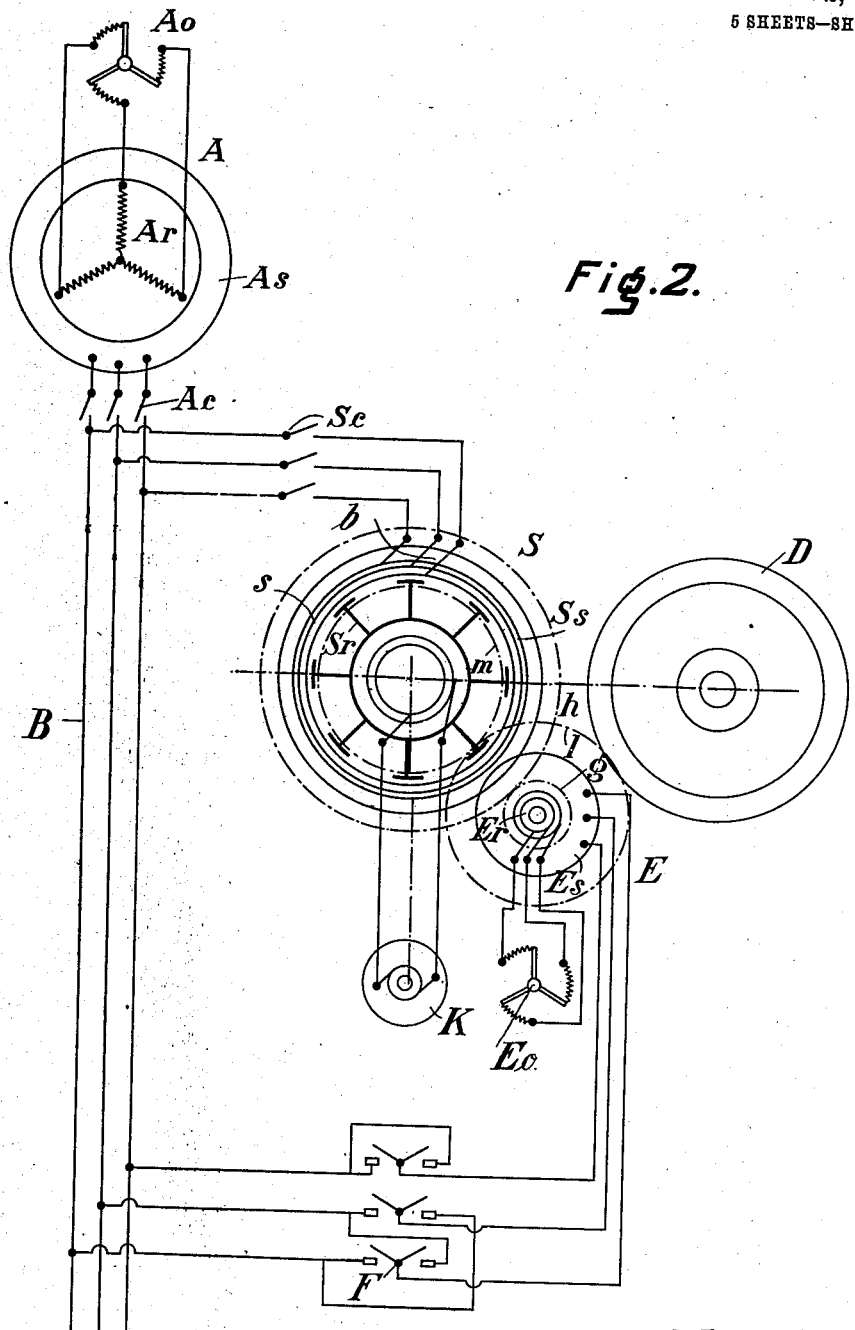

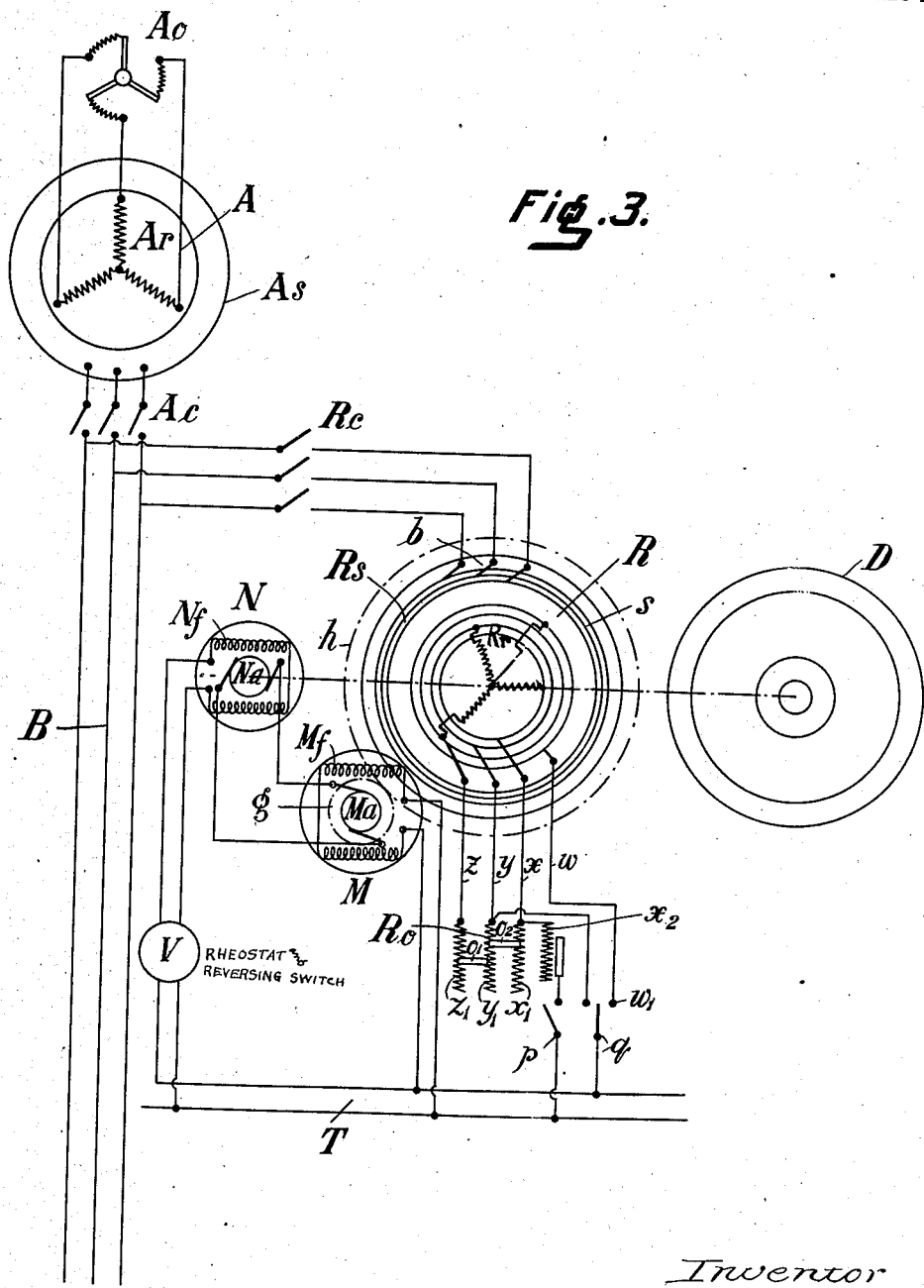

R. S. McLEOD.
ALTERNATING CURRENT REGULATOR.
APPLICATION FILED OCT. 22, 1906.

913,757.

Patented Mar. 2, 1909.
5 SHEETS—SHEET 5.

Attest:
C. S. Middleton
E. N. Sarton

Inventor
Robert S. McLeod
By Spear, Middleton, Donaldson & Spear
Attys

UNITED STATES PATENT OFFICE.

ROBERT STAFFORD McLEOD, OF DIDSBURY, MANCHESTER, ENGLAND.

ALTERNATING-CURRENT REGULATOR.

No. 913,757.   Specification of Letters Patent.   Patented March 2, 1909.

Application filed October 22, 1906. Serial No. 340,060.

*To all whom it may concern:*

Be it known that I, ROBERT STAFFORD MCLEOD, a subject of the King of Great Britain, and a resident of Didsbury, Manchester, England, have invented certain new and useful Improvements in Alternating-Current Regulators, of which the following is a specification.

This invention relates to apparatus for controlling the supply of energy from alternating current generators or mains to alternating current motors, and is especially applicable to alternating current winding apparatus and the like, in which the motor is usually of considerable size, and in which the energy taken from the generator is very considerable at starting, and the object of the invention is to provide auxiliary alternating current plant so arranged and connected to the generator, or mains, the motor, and a fly-wheel that energy is accumulated at those periods when the energy demanded by the motor is small, and is supplied to the motor when its demand, say at starting, is great; in this way the demand on the generator or mains is maintained fairly constant, and economy of working insured by reducing the peak of the load on the generator.

Broadly described such apparatus, constructed in accordance with my invention, comprises;—an alternating current main motor A electrically connected to the generator or supply mains B; an auxiliary alternating current machine C, electrically connected to the generator or the supply mains, and either mechanically connected to a fly-wheel D or so built that its rotor forms a heavy fly-wheel; and means E, for rotating at variable speeds, and preferably in either direction, that part of the auxiliary machine which is usually referred to as the stator, but which, for the sake of clearness, I will hereinafter refer to as the case.

By controlling the rotation of the case I am enabled, by rotating it in the same direction as the motor, to cause the machine to act as a motor and to accelerate the heavy rotating mass and thus store up energy in it; and by reducing the speed of rotation of the case, or reversing its rotation, to cause the machine to act as a dynamo, which, by retarding the heavy rotating mass, converts the energy stored therein into electrical energy which it transfers to the mains feeding the main motor. In this way energy is stored up in the heavy rotating mass when the load on the main motor is light, which energy is returned to the mains when the load on the main motor is heavy.

I have illustrated my invention in the accompanying drawings in which;

Figure 1 represents the arrangement when the auxiliary machine is a three phase induction machine; Fig. 2 represents the arrangement when the auxiliary machine is a three phase synchronous machine; Fig. 1ᵃ is a diagrammatic representation showing the relation and connection of the broad features of the invention; Fig. 3 shows the preferred arrangement for starting, and rotating the case of, the auxiliary machine which is shown as a synchronous machine; and Figs. 4, 5, 6, 7 and 8 are diagrams to further explain the arrangements illustrated in Fig. 3.

I will in the first instance, by way of example, describe my invention with reference to an alternating current induction motor used as the auxiliary motor, in which case the arrangement which is diagrammatically represented in Fig. 1 of the accompanying drawings, is as follows:

A is the main motor connected to the supply mains B by a controlling switch A*c*; A*s* is the stator, A*r* the rotor, and A*o* the controlling rotor resistance of this motor.

C is the auxiliary motor connected to the supply mains by a controlling switch C*c*; C*r* is the rotor, and C*o* the controlling rotor resistance of this motor. The part of this motor usually termed the stator is, according to the present invention adapted to rotate, and as stated, to avoid ambiguity, that part C*s* will be referred to as the case, it is to be understood however that electrically it is constructed, arranged and wound as a stator; the case is provided with three slip rings $s$, and the current is led to the case or "stator" windings through the brushes $b$.

A heavy fly-wheel D is connected to the rotor $Cr$ of the auxiliary motor. I so arrange the stator $Cs$ of this machine that it is adapted to be rotated, when the demand for energy by the main motor is small, in such direction as to increase the speed of the rotor $Cr$ and attached fly-wheel D, and so store up energy in the latter, which energy is returned to the mains B and supplied to the main motor A when the demand by the latter is increased; the transfer being effected by the reduction of speed or the reversal of rotation of the case or stator $Cs$ of the auxiliary machine C, whereby the relative movement between its case and its rotor exceeds that which corresponds with synchronism and the machine becomes a generator transforming the kinetic energy previously stored up in the fly-wheel into electrical energy which it delivers to the mains to supplement that of the main generator.

The means for rotating the case may be either mechanical or electrical; preferably they consist of an electro motor E energized from the mains B. In the arrangement illustrated the case $Cs$ of the motor C is adapted to be rotated by a motor E, which in this arrangement is a three phase induction motor; the rotor $Er$ of this motor is connected by suitable gear such as the spur wheels $g$ and $h$ to the case. The stator $Es$ of the motor E is connected to the mains by a reversing switch F, and its rotor currents are controlled by a resistance $Eo$. In some cases I prefer to employ in this arrangement a continuous current motor, as shown in connection with Fig. 3.

Instead of connecting the motor E to the case $Cs$ by gearing the case may form the rotor of the motor; or in some cases the case $Cs$ may be driven from the main motor A especially when the variation of speed or direction of rotation, or the latter corresponds, (as is the case in a winding motor), with the rate at which it demands supply from the mains, and therefore with the desired action of the auxiliary machine.

The energy imparted to the auxiliary rotating system is transferred to it in part through the auxiliary machine and in part through the motor E which drives the case of the auxiliary machine, and usually the arrangement would be so designed as to make the last mentioned part of the energy relatively as small as possible.

The action is as follows:—The auxiliary machine C which, as stated, I will in the first instance assume to be a three phase induction machine, is started up either with its case stationary or rotated so as to facilitate the starting, the resistance $Co$ in the rotor being used to control the rotor currents; if now the main motor A is either stationary or under light load, the case of the auxiliary machine is maintained in rotation; its rotor with the attached fly-wheel will then run up to synchronous speed relatively to the rotating case; as soon as the demand for energy by the main motor exceeds, say, the normal, the rotation of the case of the auxiliary machine is by control of its driving motor reduced and if necessary reversed, whereupon the rotor and fly-wheel speed, relatively to the case, exceeds the synchronous speed, and the auxiliary machine acts as a generator, the energy lost by the fly-wheel as it slows down being transferred through the mains to the main motor.

The switches controlling the resistance $Co$ in the auxiliary machine rotor and the controlling and starting means F and $Eo$ of the case driving motor are connected together and to the main motor controlling means such as $Ac$ and $Ao$ so that the operations described may be performed in sequence either by hand or automatically.

When the main motor is used to rotate the case and where such motor is reversed from time to time, it may be necessary to so connect it to the case that its rotation in one direction is inoperative.

I may, instead of using an induction motor for the auxiliary machine use a synchronous motor in which case the action is similar except of course that the change in speed or direction of rotation of the case must be made more gradually than when an induction motor is used, and that an exciter or rectifier must now be used to excite the field of the synchronous machine. The motor which drives the case would be so arranged with a resistance that it would not be able to accelerate the case sufficiently rapidly to cause the rotor to pull out of step with the rotating field; its action being to cause enough displacement between the rotor and the field of the auxiliary machine to change the machine from a motor to a generator, or vice versa, as described.

I have illustrated in Fig. 2, the modification in which a synchronous motor S is employed instead of the induction motor C. The motor S is shown with a multipolar rotating field $Sr$ connected to the fly wheel D; the armature or case $Ss$ is shown wound for three phase currents and is connected through the switch gear $Sc$ to the mains B; the current is led to the windings of $Ss$ through the three slip rings $s$, and bushes $b$. The rotating field is excited by an exciter K which may be connected to the shaft of $Sr$ or be independently driven. The case $Ss$ is, as before, geared to the motor E and the connections of the motor E and the main motor A are as described in reference to Fig. 1; the action of the apparatus is also as described.

The motor S being a synchronous motor, it will be necessary to provide suitable means for starting up the rotor $Sr$ and its connected fly-wheel; this may be accomplished in a variety of ways,—For instance, the motor E may be used to drive the case $Ss$ in a direction opposite to that in which the stator or case field produced by the three phase currents rotates and at an equal speed; this field then becomes stationary, and the field system $Sr$ can be excited; if now the speed of $Ss$ be gradually reduced and $Ss$ finally brought to rest, the field system $Sr$ (and the connected fly-wheel) will follow the rotating field in $Ss$ and rotate finally relatively to $Ss$ at synchronous speed. As an alternative the case rotating motor E may be used to rotate $Sr$ to synchronous speed, a second pair of spur wheels $l$ and $m$ being provided for this purpose; the pinions may be made to slide, or a clutch may be provided, so that the pinions may be alternatively engaged with the shaft of the motor E. Or, of course, an induction motor may be provided for the purpose of starting up the rotor $Sr$.

In some cases the mode of starting up synchronous motors in which the field $Sr$ is adapted to be divided in sections and connected up as an induction motor rotor, may be used; in this case $Ss$ may be allowed to run free in the first instance, which eases the starting, and is afterwards gradually brought to rest by means of a brake device.

I have illustrated the preferred arrangement in Fig. 3. In this arrangement the main motor A is connected, as described, to the mains B and the windings of the case $Rs$ of the machine R are connected to the mains B through the slip rings $s$ brushes $b$ and the switch $Rc$. The rotor $Rr$ of the machine R is connected to a fly-wheel D, and the three windings of the rotor are connected to resistances $Ro$. The case $Rs$ is rotated by a continuous current motor M, by means of gear wheels $g$ and $h$. The current for the armature $Ma$ of the motor M is obtained from a continuous current machine N, preferably driven by being attached to the common shaft of R and D. T are continuous current mains, and the fields $Mf$ and $Nf$ of M and N are excited from these mains; a rheostat and reversing switch V is used to control the field excitation of N so that its value may be varied from a maximum positive value through zero to a maximum negative value; in this way the current supplied by N to the armature of M may be varied in magnitude and direction, and the direction of rotation and the speed of M varied accordingly; the arrangement is also admirably adapted to start up M.

In the arrangement now under consideration I prefer to wind the rotor $Rr$ of the machine R with a three-phase winding, the ends $x, y, z$, of which are connected through the usual arrangement of three slip rings and brushes to resistances $x_1, y_1$, and $z_1$, of a three part resistance $Ro$; the neutral point $w$ of the winding is also connected through a slip ring to the contact $w_1$; a switch $p$ connected to one of the continuous current mains is adapted to connect this main, through a resistance $x_2$ to $x$ the end of one of the three windings, and a switch $q$ connected to the other continuous current main is adapted to connect the latter either to $y$ the end of another of the three windings, or to $w$ the neutral point, as may be desired. This arrangement of the winding of $Rr$ enables me to start up the machine R after the manner of an induction motor, the switches $p$ and $q$ being open and the contact bars $o_1$ and $o_2$ of the resistance $Ro$ being moved in the usual manner to gradually cut out the resistances $x_1, y_1, z_1$; when a speed approximately that of synchronism is reached the switches $p$ and $q$ are closed and $Rr$ becomes excited by the continuous current either on one leg or two legs of the three phase winding, and the machine then runs as a synchronous machine, the winding or windings not connected to the continuous current mains acting as an amortiseur.

Fig. 6 is the arrangement when the switch $p$ is connected to $x$ and the switch $q$ connected to $y$; and Fig. 8, when the switch $p$ is connected to $x$ and the switch $q$ to $w$.

Figure 1:
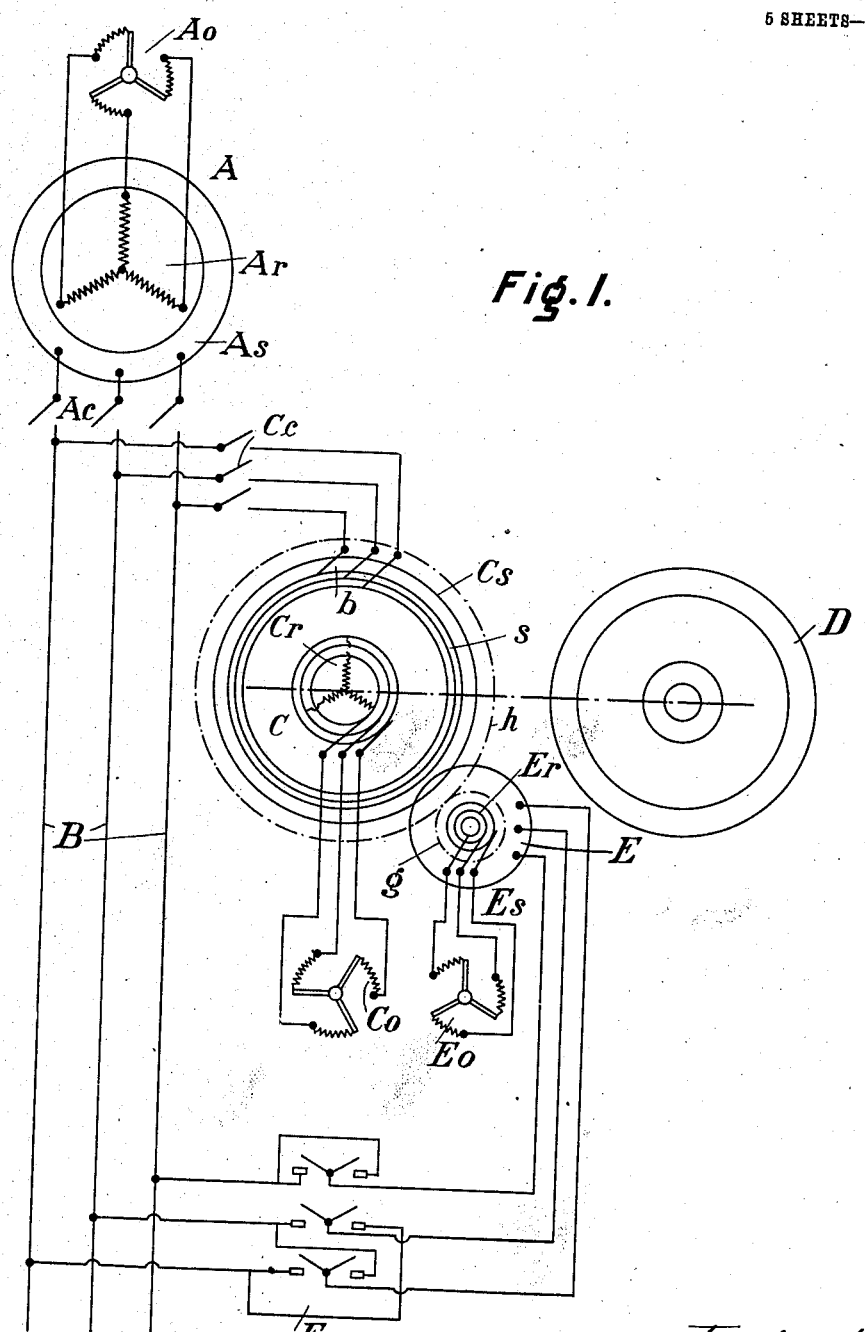
Figure 1A:
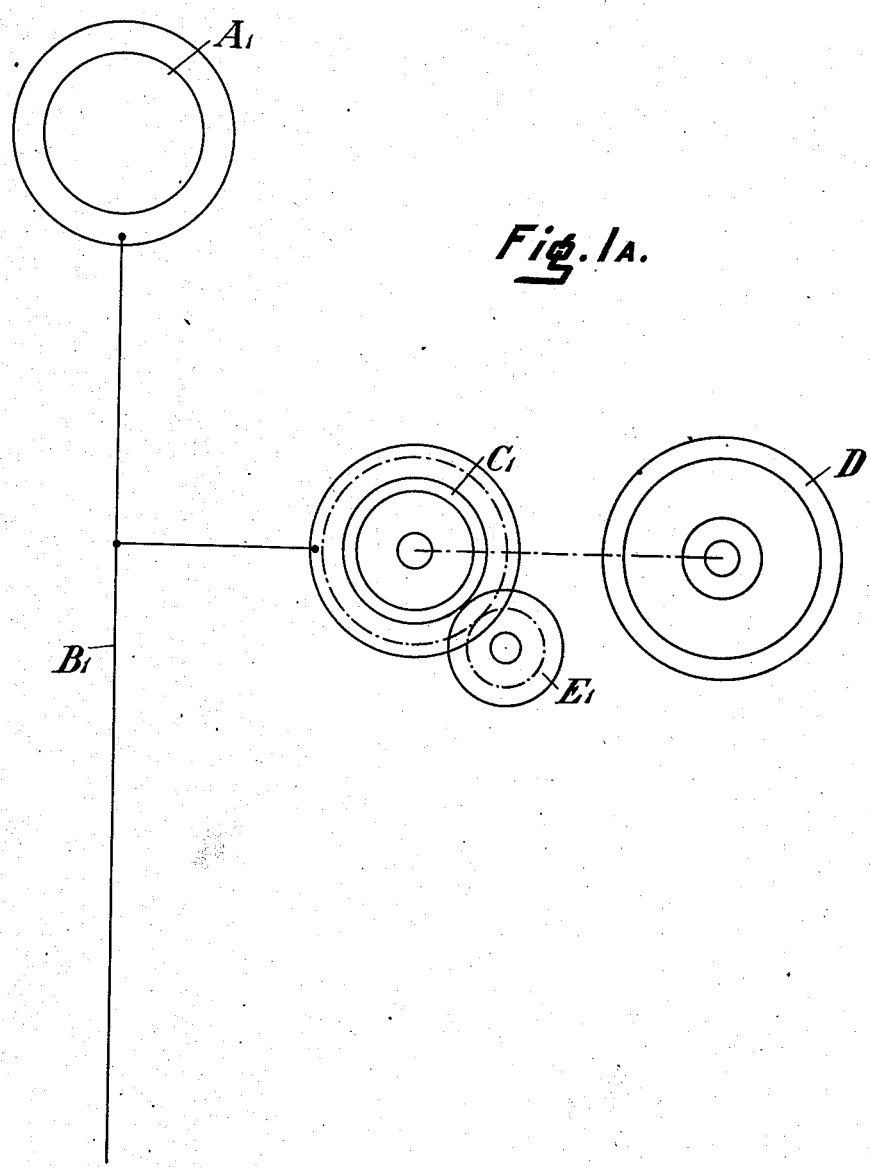
Figure 4:
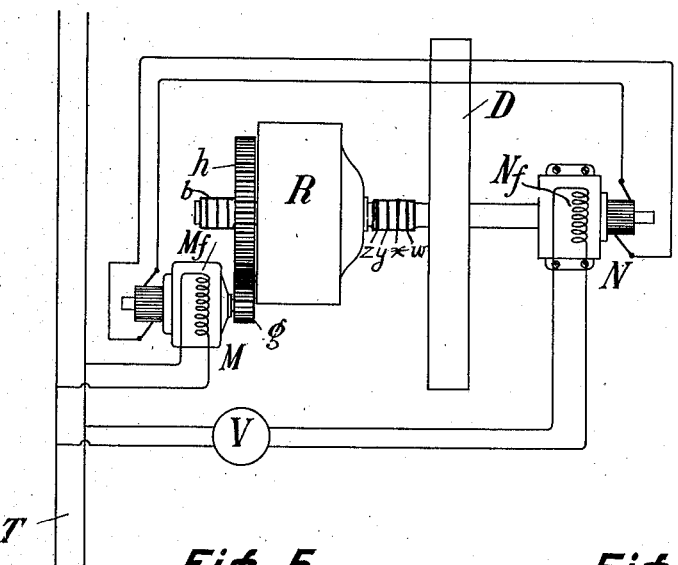
Fig. 4 shows clearly the arrangement of the windings of M and N.
Figure 5:
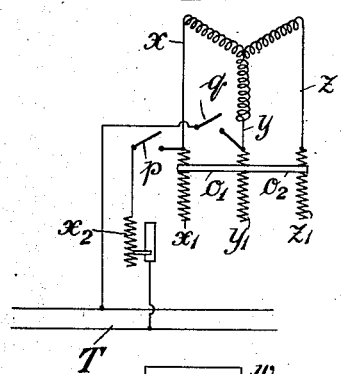
Figs. 5 and 6 show the starting up and running connections, respectively, of $Rr$ when the continuous current is on two legs of the three phase winding
Figure 6:
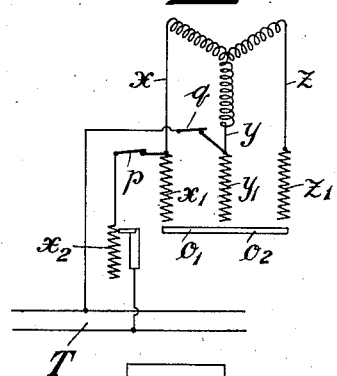
Figure 7:
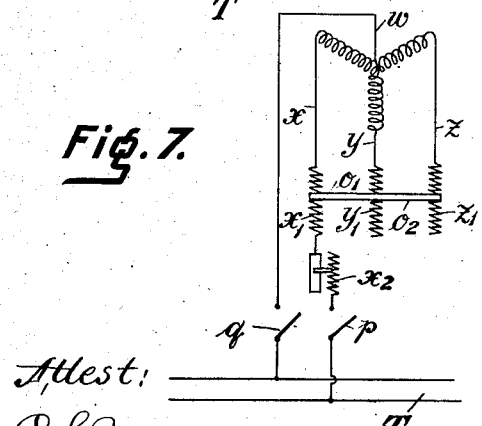
Figs. 7 and 8 show the starting up and running connections respectively when the continuous current is on one leg only of the three-phase winding.
Figure 8:
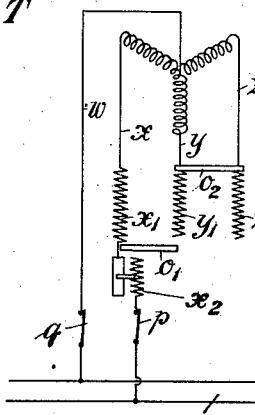

It is to be understood that while I have described my invention in reference to the cases illustrated by way of example, I do not limit myself to these applications, nor to the details described by way of example, as the invention is applicable generally and may be considerably modified within the limits of my invention as claimed herein. It is to be understood also that while I have referred to the case as being rotated, when the main motor load is light, in the same direction as the rotor so as to accelerate the latter to an absolute speed exceeding that of synchronism, this need not necessarily be done: The case for instance may be held stationary when the main motor is lightly loaded and be reversely rotated at heavy loads to give the generator action. Obviously the rotor may, instead of being connected to the fly-wheel be made sufficiently heavy to form a fly-wheel itself.

The accompanying drawings illustrate the arrangements diagrammatically and no attempt has been made to illustrate the details of constructions which will be readily understood by those familiar with the art.

In the drawings I have shown the windings of the case connected to the mains and the windings of the rotor connected to the controlling means. It is obvious, however, that the rotor windings may be connected to the mains and the case winding connected to the controlling means. In the statement of claims herein, I have, for the sake of brevity, used the terms rotor and case and I wish it to be understood that I employ these terms to designate the two parts of an alternating current machine between which there is relative movement, and quite irrespectively of the type of electrical winding which may be employed. For example the alternating current mains to which the one part of the machine is connected may be single phase or poly-phase and the winding of the other part of the machine may be any convenient arrangement of poly-phase winding. In some cases where the one part of the machine is connected to three-phase mains the other part of the machine may be wound with a two-phase winding so that it may be started up as an induction motor and run as a synchronous motor with the said two-phase winding connected to continuous current mains. In some cases also it may be desirable to wind that part of the auxiliary machine which is not connected to the mains by both a poly-phase winding for the purpose of starting up and a continuous current winding for running as a synchronous machine.

Having now fully described my invention, I declare that what I claim is:—

1. In combination with alternating current mains, an alternating current machine the rotor of which is mechanically connected to a rotating mass and the rotatable case of which is electrically connected to the mains, and means for continuously rotating the case at various speeds in one direction or the other; substantially as described.

2. In combination with alternating current mains and a motor electrically connected thereto, an alternating current machine the rotor of which is mechanically connected to a rotating mass and the rotatable case of which is electrically connected to the mains, and means for continuously rotating the case at various speeds in one direction or the other; substantially as described.

3. In combination with alternating current mains, an alternating current machine the rotor of which is mechanically connected to a rotating mass and the rotatable case of which is electrically connected to the mains and an electric motor adapted to rotate the case; substantially as described.

4. In combination with alternating current mains and a motor electrically connected thereto, an alternating current machine the rotor of which is mechanically connected to a rotating mass and the rotatable case of which is electrically connected to the mains and an electric motor adapted to rotate the case; substantially as described.

5. In combination with three-phase alternating current mains, a three-phase alternating current machine the rotor of which is mechanically connected to a rotating mass and the rotatable case of which is electrically connected to the mains and means for continuously rotating the case at various speeds in one direction or the other; substantially as described.

6. In combination with three-phase alternating current mains, a three-phase alternating current motor electrically connected thereto, a three-phase alternating current machine the rotor of which is mechanically connected to a rotating mass and the rotatable case of which is electrically connected to the mains, and means for continuously rotating the case at various speeds in one direction or the other; substantially as described.

7. In combination with three-phase alternating current mains, a three-phase alternating current machine the rotor of which is mechanically connected to a rotating mass and the rotatable case of which is electrically connected to the mains and an electro motor adapted to rotate the case; substantially as described.

8. In combination with three-phase alternating current mains and a three-phase alternating current motor electrically connected thereto, a three phase alternating current machine the rotor of which is mechanically connected to a rotating mass and the rotatable case of which is electrically connected to the mains and an electro motor adapted to rotate the case; substantially as described.

9. In combination with alternating current mains, an alternating current machine the rotor of which is mechanically connected to a rotating mass and the rotatable case of which is electrically connected to the mains, and a continuous current motor adapted to rotate the case; substantially as described.

10. In combination with alternating current mains and a motor electrically connected thereto, an alternating current machine the rotor of which is mechanically connected to a rotating mass and the rotatable case of which is electrically connected to the mains and a continuous current motor adapted to rotate the case; substantially as described.

11. In combination with three-phase alternating current mains, a three phase alternating current machine the rotor of which is mechanically connected to a rotating mass and the rotatable case of which is electrically connected to the mains and a continuous current electro motor adapted to rotate the case; substantially as described.

12. In combination with three-phase alternating current mains, a three phase alternating current motor electrically connected thereto, a three phase alternating current machine the rotor of which is mechanically connected to a rotating mass and the rotatable case of which is electrically connected to the mains and a continuous current motor adapted to rotate the case; substantially as described.

13. In combination with alternating current mains, an alternating current machine the rotor of which is mechanically connected to a rotating mass and the rotatable case of which is electrically connected to the mains, continuous current mains, rotor resistances, switches adapted to connect the rotor winding either to the resistances or to the direct current mains and means for rotating the case; substantially as described.

14. In combination with alternating current mains, a synchronous alternating current machine the rotor of which is mechanically connected to a rotating mass and the rotatable case of which is electrically connected to the mains, means for starting up the machine as an induction motor and means for rotating the case; substantially as described.

15. In combination with alternating current mains, a synchronous alternating current machine the rotor of which is mechanically connected to a rotating mass, and the rotatable case of which is electrically connected to the mains, means for starting up the machine as an induction motor, and a continuous current motor adapted to rotate the case; substantially as described.

16. In combination with alternating current mains, a synchronous alternating current machine the rotor of which is mechanically connected to a rotating mass and the rotatable case of which is electrically connected to the mains, means for starting up the machine as an induction motor, a continuous current motor adapted to rotate the case, and means for varying and reversing the armature current of the said continuous current motor; substantially as described.

17. In combination with alternating current mains, a synchronous alternating current machine comprising a rotor and a rotatable case, said rotor being mechanically connected to a rotating mass and the rotatable case being electrically connected to the mains, means for starting up the machine as an induction motor, a continuous current motor adapted to rotate the case, continuous current mains, a second continuous current machine driven by the alternating current machine the armature of which latter is connected to the armature of the continuous current motor and the field of which is connected to the continuous current mains, a rheostat and a reversing switch to control the field of the second continuous current machine; substantially as described.

18. In combination the mains supplied with alternating current, the mains supplied with continuous current, the alternating machine, rotor resistances, the fly wheel, the continuous current motor, the means for varying the direction of rotation and the speed of the continuous current motor and the means for connecting the alternating current machine rotor to the resistances to start up and to the continuous current mains to run as a synchronous machine; substantially as described.

19. In combination, the mains supplied with alternating current, the mains supplied with continuous current, the alternating machine comprising a rotor and a rotatable case, rotor resistances, the fly wheel, the continuous current generator driven by the alternating machine the motor to drive the case the armature of which motor is connected in series with the armature of the continuous current machine, the rheostat the reversing switch to control the field of the continuous current generator, and the switch gear to connect the alternating current machine rotor either to the resistances or to the continuous current mains; substantially as described.

20. In combination the alternating current mains, an alternating current machine connected to the alternating current mains the rotor of which is connected to a heavy rotating mass and the case of which is adapted to rotate, and means for continuously rotating the case at various speeds in one direction or the other; substantially as described.

21. In combination the alternating current mains, an alternating current machine connected thereto the rotor of which is connected to a heavy rotating mass and the case of which is adapted to be rotated, and an electro motor to rotate the said case; substantially as described.

22. In combination the alternating current mains, an alternating current machine connected thereto the rotor of which is connected to a heavy rotating mass and the case of which is adapted to be rotated, continuous current mains and a continuous current motor adapted to rotate the said case; substantially as described.

23. In combination, the alternating current mains, the alternating current machine connected thereto and adapted to be started up as an induction motor and to run as a synchronous machine, the rotor of which is connected to a heavy rotating mass and the case of which is adapted to rotate, continuous current mains, a continuous current generator excited by the continuous current mains, a continuous current motor adapted to drive the case and the armature of which is supplied with current from the continuous current generator, and means for varying the sign and magnitude of the field excitation of the continuous current generator; substantially as described.

In witness whereof I have hereunto set my hand in the presence of two subscribing witnesses.

ROBERT STAFFORD McLEOD.

Witnesses:
J. E. LLOYD BARNES,
H. THOMAS.